(12) United States Patent
Kennedy et al.

(10) Patent No.: US 6,269,364 B1
(45) Date of Patent: Jul. 31, 2001

(54) METHOD AND APPARATUS TO AUTOMATICALLY TEST AND MODIFY A SEARCHABLE KNOWLEDGE BASE

(75) Inventors: Raymond E. Kennedy, Oregon City; William J. Gallagher, Hillsboro; Gary D. Swanson, Portland; Chadd D. Smith, Canby; Paul M. Cohen, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/161,163

(22) Filed: Sep. 25, 1998

(51) Int. Cl.[7] .................................................. G06F 17/30
(52) U.S. Cl. .............................. 707/5; 707/3; 707/103; 707/4
(58) Field of Search ....................... 707/3, 4, 100; 395/336

(56) References Cited

U.S. PATENT DOCUMENTS

| | | | |
|---|---|---|---|
| 5,634,051 | * 5/1997 | Thomson | 707/5 |
| 5,694,559 | * 12/1997 | Hobson et al. | 395/336 |
| 5,749,079 | * 5/1998 | Yong et al. | 707/100 |
| 5,907,837 | * 5/1999 | Ferrel et al. | 707/3 |
| 5,983,218 | * 11/1999 | Syeda-Mahmood | 707/3 |
| 6,061,678 | * 5/2000 | Klein et al. | 707/3 |
| 6,070,160 | * 5/2000 | Geary | 707/4 |
| 6,094,649 | * 7/2000 | Bowen et al. | 707/3 |
| 6,169,992 | * 1/2001 | Beall et al. | 70/103 R |

* cited by examiner

Primary Examiner—Hosain T. Alam
Assistant Examiner—Anh Ly
(74) Attorney, Agent, or Firm—Blakely, Sokoloff, Taylor & Zafman LLP (57) ABSTRACT

In accordance with a first aspect of the present invention, duplicate responses to a query are automatically determined and eliminated. In accordance with a second aspect of the present invention, invalid responses to a query are automatically determined and eliminated. In accordance with a third aspect of the present invention, an indication is generated if no responses are returned from a knowledge base for a query, in which case provision of a response is automatically facilitated so that at least one response will be returned from the knowledge base for future resubmissions of the query. In one embodiment, all three aspects of the present invention are performed for a given query.

17 Claims, 5 Drawing Sheets

| STRIPPED QUERY |
|---|
| MOUSE<br>CURSOR<br>FAILS<br>TRACK<br>MOVEMENT |

FIG. 3

| STRIPPED RESPONSE | SYNONYMS |
|---|---|
| CD | COMPACT DISK, ... |
| PLAYER | DRIVE, ... |
| FAILS | DIES, INSUFFICIENTLY, ... |
| FIND | ENCOUNTER, IDENTIFY, ... |
| TRACK | FOLLOW, TRACE, ... |
| START | BEGIN, COMMENCE, ... |
| CLEANING | CLEANSING, PURIFYING, ... |
| SURFACE | FACE, EXTERIOR, ... |
| COMPACT | CONCENTRATE, CONDENSE, ... |
| DISK | STORAGE MEDIUM, ... |

METHOD AND APPARATUS TO AUTOMATICALLY TEST AND MODIFY A SEARCHABLE KNOWLEDGE BASE

BACKGROUND OF THE INVENTION

1. Field of the Invention

The present invention pertains to the field of searchable knowledge bases. More particularly, this invention relates to the art of eliminating duplicate information, identifying missing information, and verifying the validity of information in a searchable knowledge base.

2. Background

Searchable knowledge bases, such as databases, are used in a wide range of applications. For instance, a database can be used for customer service support at a help desk. A help desk operator may use a customer's question as a query to a database of solutions or to a database of an index to solutions. In which case, a search engine may retrieve one or more solutions, or links to solutions, based on a comparison of the query to the database entries.

When database entries are retrieved, one or more of the entries, or the items of information to which the entries point, may be duplicates. For instance, a database may index items of information on a network, such as the internet. The same items of information may be accessible at multiple host systems, so that each duplicate item of information may be separately indexed in the database. In which case, a search engine may retrieve database entries that point to different locations, although the locations may contain duplicate information. Sorting through a list of duplicate information, or pointers to duplicate information, can be time consuming and misleading.

Furthermore, a knowledge base generally will not have a response for every query. For instance, certain queries may not retrieve any responses at all. Even if one or more responses are retrieved, the responses may still be invalid. That is, a response may have nothing to do with the subject matter of a query. For instance, a search engine may simply look for database entries which contain one or more of the same words as the query, and rank the entries based on the number of times one or more words from the query appear in the database entry. If a query is not carefully crafted to avoid potentially misleading words, responses to the query may be irrelevant. Also, words may have different meanings in different contexts, so even a carefully crafted query may retrieve responses that are not related to the topic of the query. A query for which no response, or only irrelevant responses, are retrieved may indicate a "hole" in the knowledge base. If "holes" are not identified as they are encountered, a potentially valuable source of information may be lost that could be used to improve the content of the database over time.

Therefore, a need exists for an improved method and apparatus to automatically eliminate duplicate database information and identify potential holes in a knowledge base.

SUMMARY OF THE INVENTION

In accordance with a first aspect of the present invention, duplicate responses to a query are automatically determined and eliminated. In accordance with a second aspect of the present invention, invalid responses to a query are automatically determined and eliminated. In accordance with a third aspect of the present invention, an indication is generated if no responses are returned from a knowledge base for a query, in which case provision of a response is automatically facilitated so that at least one response will be returned from the knowledge base for future resubmissions of the query. In one embodiment, all three aspects of the present invention are performed for a given query.

BRIEF DESCRIPTION OF THE DRAWINGS

Examples of the present invention are illustrated in the accompanying drawings. The accompanying drawings, however, do not limit the scope of the present invention whatsoever. Like references in the drawings indicate similar elements.

DETAILED DESCRIPTION

In the following detailed description, numerous specific details are set forth in order to provide a thorough understanding of the present invention. However, it will be understood by those skilled in the art that the present invention may be practiced without these specific details and that the present invention may be practiced in a variety of alternate embodiments. In other instances, well known methods, procedures, components, and circuits have not been described in detail.

Figure 1:
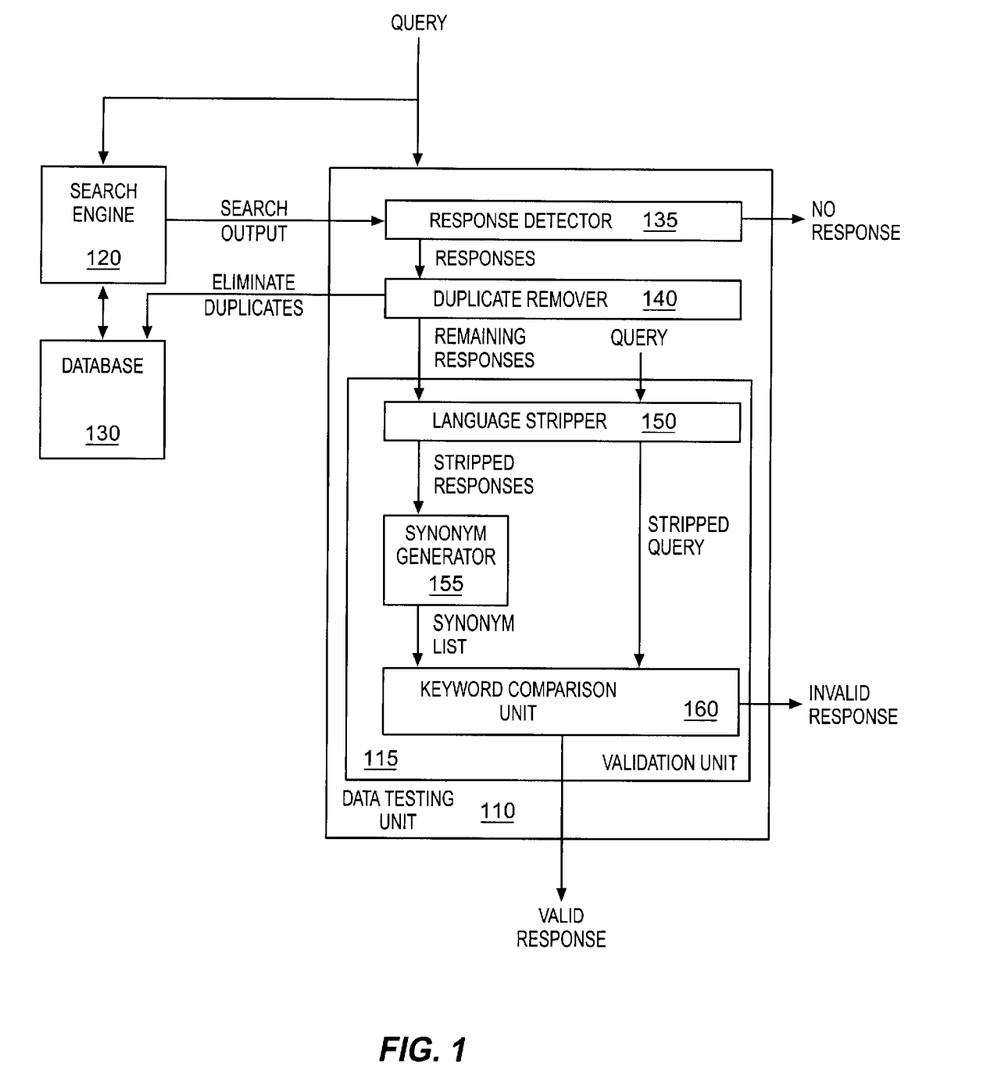
FIG. 1 illustrates one embodiment of the present invention.

FIG. 1 illustrates one embodiment of the present invention. As discussed below, database testing unit 110 automatically tests and modifies a searchable knowledge base stored or indexed database 130. Database testing unit 110 eliminates duplicate database entries, either from a list of entries retrieved from database 130 or from database 130 itself, and identifies potential holes in the knowledge base when no entries, or potentially invalid entries, are retrieved in response to a query.

As shown in FIG. 1, a query is provided to search engine 120 and database testing unit 110. Search engine 120 accesses database 130 and provides search output to database testing unit 110. Any number of search engines and databases can be used for search engine 120 and database 130. Search engine 120 may be locally accessed or remotely accessed over a network.

In the illustrated embodiment, database 130 stores a knowledge base wherein each database entry is an item of information in the knowledge base. Database 130 may be locally accessed or remotely accessed over a network. In alternate embodiments, database 130 may store an index wherein each database entry is a link to an item of information in a knowledge base stored elsewhere. In an index database, a database entry may include the full text of the item of information to which the entry points, or just key words from the item of information. An indexed knowledge base may be centrally stored or distributively stored on a network such as the internet.

When search engine 120 identifies a database entry corresponding to a query, a response is included in the search output for the identified entry. The search output may include several responses. In the illustrated embodiment, a response consists of an item of information from the knowledge base. In alternate embodiments, a response may be an index to an item of information stored elsewhere.

The search output is provided to response detector 135 within database testing unit 110 to determine if no responses were retrieved for the query. That is, if the search output does not include at least one response, a "hole" in the knowledge base may be indicated. In one embodiment, responses are provided in an identifiable format. If anything other than the identifiable format is provided, response detector 135 can recognize it as something other than a response. If no responses are received, response detector 135 asserts the NO RESPONSE signal.

The NO RESPONSE signal can flag the query for later consideration. For instance, if the query is related to the subject matter of the knowledge base, a new item of information may be added to the knowledge base, or an existing item of information may be modified, so that an appropriate response will be retrieved for that particular query or a similar query in the future.

If one or more responses are retrieved, the responses are provided to duplicate remover 140 to identify and remove the duplicates, if any. In certain embodiments, duplicate remover 140 removes duplicate responses from the search output so that the list of responses a user receives contains no duplicates. For instance, duplicate remover 140 can perform a text comparison of each response it receives to determine if one or more responses are duplicate, and then remove the duplicates. Any number of text comparison schemes can be used.

In alternate embodiments, duplicate remover 140 may also remove duplicate database entries from database 130 so that search engine 120 will not provide the duplicate information in the future. For instance, database testing unit 110 can access database 130 with the ELIMINATE DUPLICATES signal to eliminate unnecessary duplicate entries.

In alternate embodiments in which database 130 stores an index to a knowledge base stored elsewhere, each response received from database 130 may be unique, but the items of information to which the responses point may be duplicative. For instance, if the knowledge base is distributively stored on a network, such as the internet, the same information may be stored at, or be accessible from, multiple host systems. Then, if search engine 120 generates or updates the index stored in database 130 with an automatic procedure, such as a "web crawler," database 130 may include entries for each host system even though the information stored at the host systems is duplicative. For instance, a web crawler may visit each host system where items of information can be stored and look for changes or additions. If an item of information is copied from one location to another, and the web crawler visits both locations, two unique database entries may be created for the same information.

In which case, duplicate remover 140 may access the items of information at their respective host systems to identify the duplicates. In one embodiment, duplicate remover 140 performs a content comparison wherein the textual content of each indexed item of information is compared to the textual content of every other indexed item of information. If duplicate items or substantially identical items are identified, only one database entry needs to be retained for that item of information and the rest can be eliminated. Any number of text or content comparison schemes can be used.

Under certain circumstances, however, eliminating indexed database entries may result in failure to locate the most recent data. For instance, if duplicate information is remotely located at two separate host systems, one item of information may be updated without corresponding updates being made to the other. If only one index entry has been retained, the updated information may not be indexed in database 130. If search engine 120 refreshes the database frequently, however, loosing the most recent information will be less likely. For instance, a web crawler can update database 130 more or less frequently depending on the nature of the information being indexed.

Duplicate remover 140 can use any number of criteria to decide which one of a plurality of duplicate entries to keep. For instance, duplicate remover 140 may simply keep the first occurrence of an entry and remove all duplicates. In other embodiments, particularly for a distributed knowledge base, duplicate remover 140 may also take into consideration the accessibility of the respective items of information. For instance, the database entry that points to the fastest host system, or least trafficked host system, may be preferred over database entries that point to slower or busier host systems. Similarly, a master copy may be preferred over other copies.

In addition to eliminating duplicate responses, if any, database testing unit 110 uses validation unit 145 to test the validity of the responses. In the illustrated embodiment, duplicate responses are eliminated first and only the remaining responses are tested for validity.

Depending on how search engine 120 operates, one or more responses retrieved from database 130 may be irrelevant to the subject matter of the query and therefore invalid. For instance, in one embodiment, search engine 120 compares words in a query to words in all of the database entries, and ranks the database entries based on the number of times words in the query appear in each database entry. If a query is not carefully crafted, or if the meaning of a word depends on its context, search engine 120 may retrieve invalid responses.

In the illustrated embodiment, database testing unit 110 first provides the query and the responses to language stripper 150. Language stripper 150 filters out common words in the query and the responses. For instance, conjunctions, articles, prepositions, pronouns, etc., can all be filtered out. Then, synonym generator 155 generates a list of synonyms for each remaining word in the stripped responses. Key word comparison unit 160 compares the words from the synonym list to the remaining words in the query. If at least a certain percentage of the words in a query also appear in the synonym list, then the solution is presumed to be valid. If less than the certain percentage of words appear in the synonym list, the INVALID RESPONSE signal can flag the response and the corresponding query for later consideration. For instance, if the query is valid and all of the responses to the query are irrelevant, a new item of information may be added to the knowledge base, or an existing item of information may be modified, so that an appropriate response will be retrieved for that particular query or a similar query in the future.

In certain embodiments, responses that are presumed invalid are also removed from a list of responses provided to a user. In which case, if duplicate responses have also been removed, a user is more likely to receive a shorter list of more relevant responses. At the same time, any flagged queries and/or responses can be saved and provided to a database manager for appropriate evaluation.

Figure 2:
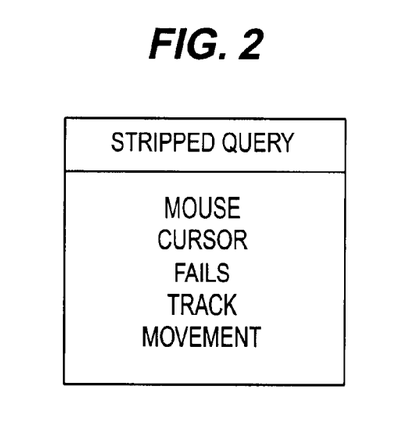
FIG. 2 illustrates one embodiment of a stripped query.
Figure 3:
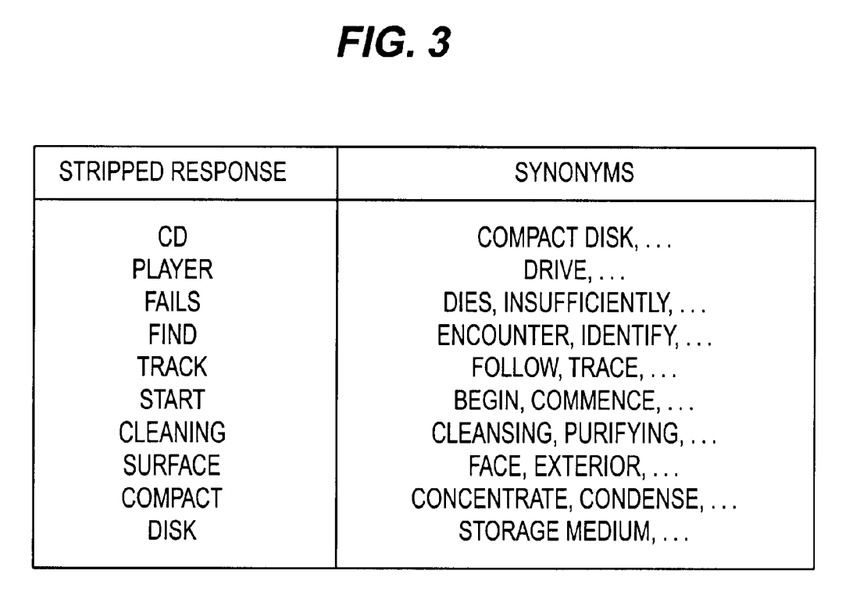
FIG. 3 illustrates one embodiment of part of a stripped response and some synonyms of the words remaining in the stripped response.

In one example, the apparatus shown in FIG. 1 may be used for computer-related customer service support. In which case, a customer service operator may accept calls from computer users and submit queries based on the calls to a computer-related knowledge base stored in database 130. An example query is, "My mouse cursor fails to track the movement of my mouse." Response detector 135 determines if no responses are retrieved. Duplicate remover 140 eliminates duplicate information, if any. Then, remaining responses are tested for validity. The word "track" may be misleading for search engine 120. For instance, some responses may deal with tracks on compact disks or tracking a video tape. Specifically, part of an example response is, "If your CD player fails to find a track on a CD, start by cleaning the surface of the compact disk . . . " Language stripper 150 strips the query and the responses. FIG. 2 illustrates one embodiment of the stripped query. FIG. 3 illustrates one embodiment of part of a stripped response. Synonym generator 155 generates synonyms, as shown in FIG. 3, for words remaining in the responses. Synonyms can be compiled from a thesaurus database, including topic-related lexicon, such as "drive" for "player," and "compact disk" for "CD." The words from the stripped response as well as their synonyms can be added to the synonym list and compared to the words in the stripped query. In the illustrated example, 40% of the words in the query appear on the synonym list. According to one embodiment, a 40% match suggests an invalid response. In which case, keyword comparison unit 160 can flag the response and the query for later consideration and eliminate the response from those retrieved by asserting the INVALID RESPONSE signal.

In alternate embodiments in which database 130 stores an index to a knowledge base stored elsewhere, database testing unit 110 may use the responses provided by search engine 120 to retrieve the items of information and provide the items of information to language stripper 150, synonym generator 155, and keyword comparison unit 160 for validation. Alternately, the validation may be performed based on the text indexed in database 130.

In alternate embodiments, one or more of the components in FIG. 1 may be re-arranged, combined, eliminated, and/or duplicated. Additional elements may also be added, such as a storage medium to store queries for which no responses or only potentially invalid responses were retrieved. Furthermore, alternate embodiments may use different validation criteria, wherein, for instance, a synonym list may be generated for a query instead of or in addition to a synonym list for a response. The valid response threshold level, or the percentage of matching words between query and response, may be a user specified variable, a function of the respective lengths of the query and the responses, etc. In certain embodiments, synonym generator 155 attempts to classify each word as a noun, verb, adjective, etc. based on context before generating a synonym list.

Queries may come from a number of different sources. For instance, a query may come from an on-line self help service, a help desk operator, etc. Queries from numerous sources may be accumulated to provide test cases for a knowledge base. Duplicate entries can automatically be removed and potential holes in the knowledge base can automatically be flagged by applying the accumulated test cases to the knowledge base. The percentage of potentially invalid responses can also be used as an indication of how well a search engine is working.

Figure 4:
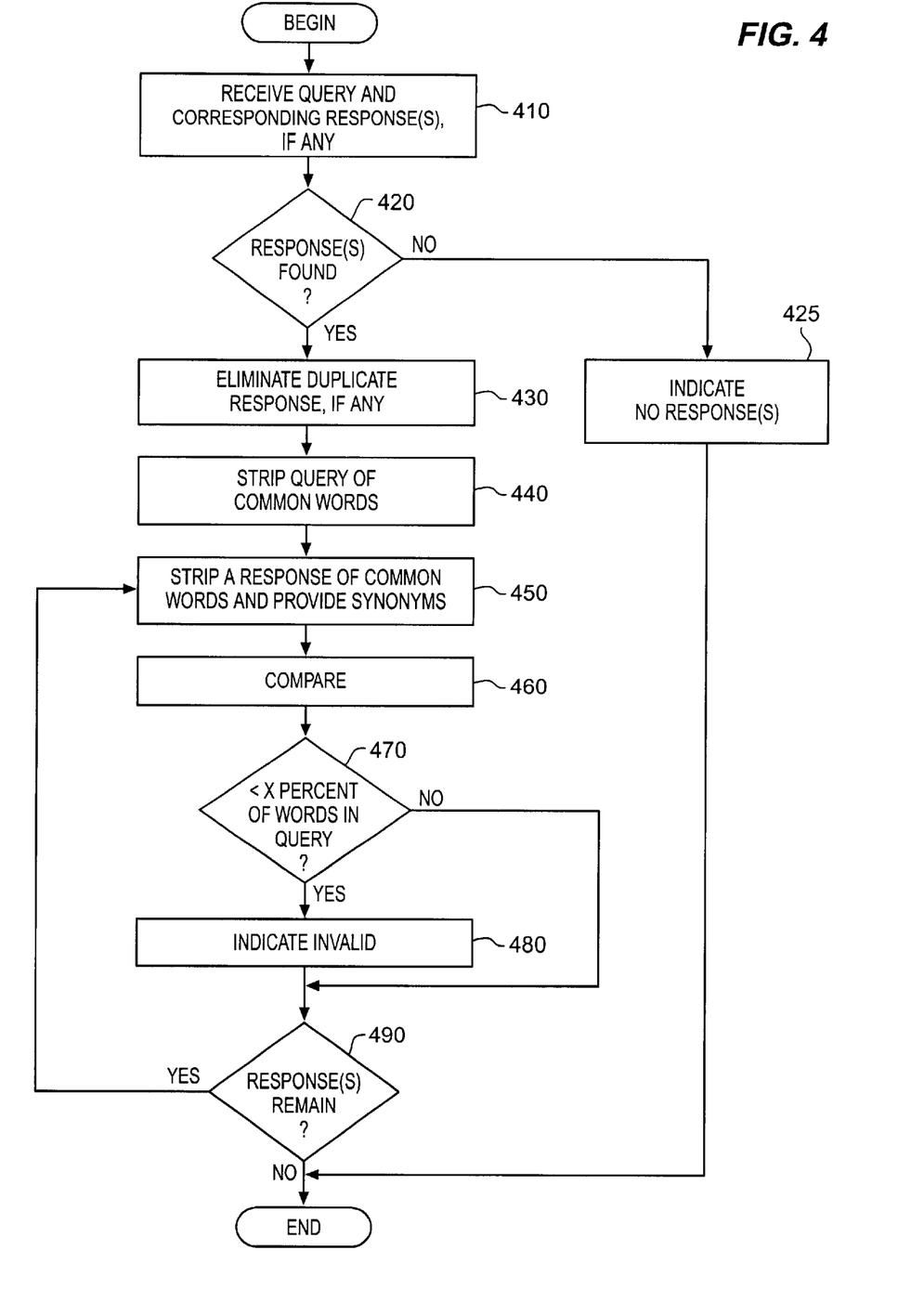
FIG. 4 demonstrates one embodiment of the present invention.

FIG. 4 demonstrates the operation of one embodiment of database testing unit 110. In step 410, database testing unit 110 receives a query and a corresponding response or responses, if any. In step 420, response detector 135 checks for responses. If no responses are found, an indication of no responses is given in step 425, and the process ends. If at least one response is found, duplicate remover 140 eliminates duplicate responses, if any, in step 430. Then language stripper 150 strips the query of common words in step 440, and strips a response of common words and provides synonyms of the remaining words in step 450. In step 460, keyword comparison unit 160 compares the stripped query with the stripped response and synonyms. In step 470, if less than X percentage of the words in the stripped query appear in the stripped response and synonyms, an invalid response is indicated in step 480. If additional responses remain in step 490, the process returns to step 450. Otherwise, the process ends.

Any number of hardware systems can be used to perform the functions of database testing unit 110. For example, database testing unit 110 may be represented by a broad category of computer systems known in the art, such as a computer system equipped with a high performance microprocessor(s), such as the Pentium® processor, Pentium® Pro processor, or Pentium® II processor manufactured by and commonly available from Intel Corporation of Santa Clara, Calif., or the Alpha® processor manufactured by Digital Equipment Corporation of Maynard, Mass..

Figure 5:
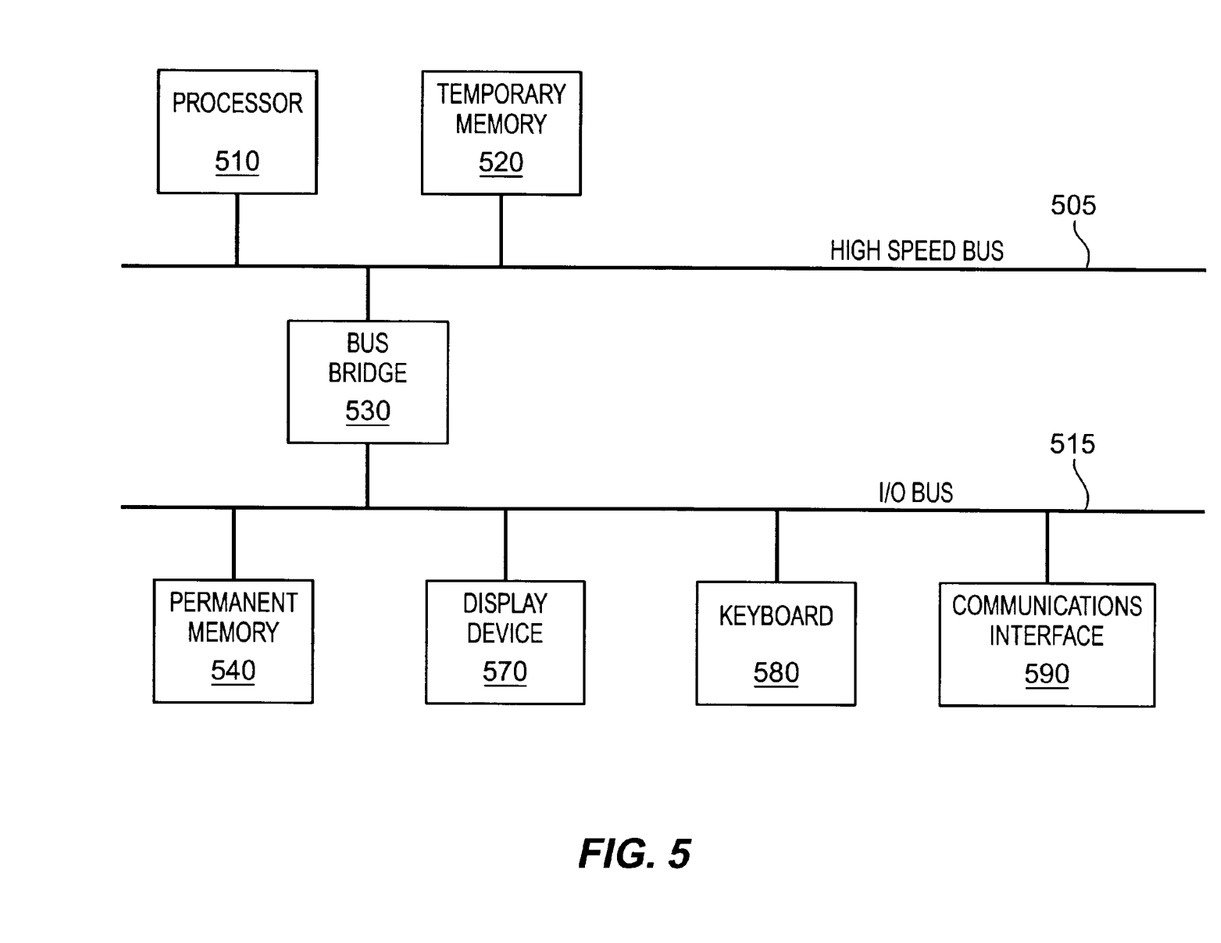
FIG. 5 illustrates a hardware system operative to perform the functions of one embodiment of the present invention.

FIG. 5 illustrates one embodiment of a suitable hardware system. In the illustrated embodiment, the hardware system includes processor 510 coupled to high speed bus 505, which is coupled to input/output (I/O) bus 515 through bus bridge 530. Temporary memory 520 is coupled to bus 505. Permanent memory 540 is coupled to bus 515. Display device 570, keyboard 580, and communications interface 590 are also coupled to bus 515.

Certain embodiments may include additional components, may not require all of the above components, or may combine one or more components. For instance, temporary memory 520 may be on-chip with processor 510. Alternatively, permanent memory 540 may be eliminated and temporary memory 520 may be replaced with an electrically erasable programmable read only memory (EEPROM), wherein software routines are executed in place from the EEPROM. Some implementations may employ a single bus to which all of the components are coupled. Additional components may be included in the hardware system, such as additional processors, storage devices like a CD ROM, memories, and other peripheral components known in the art, and the additional components may be coupled to one or more additional buses through additional bus bridges.

Figure 6:
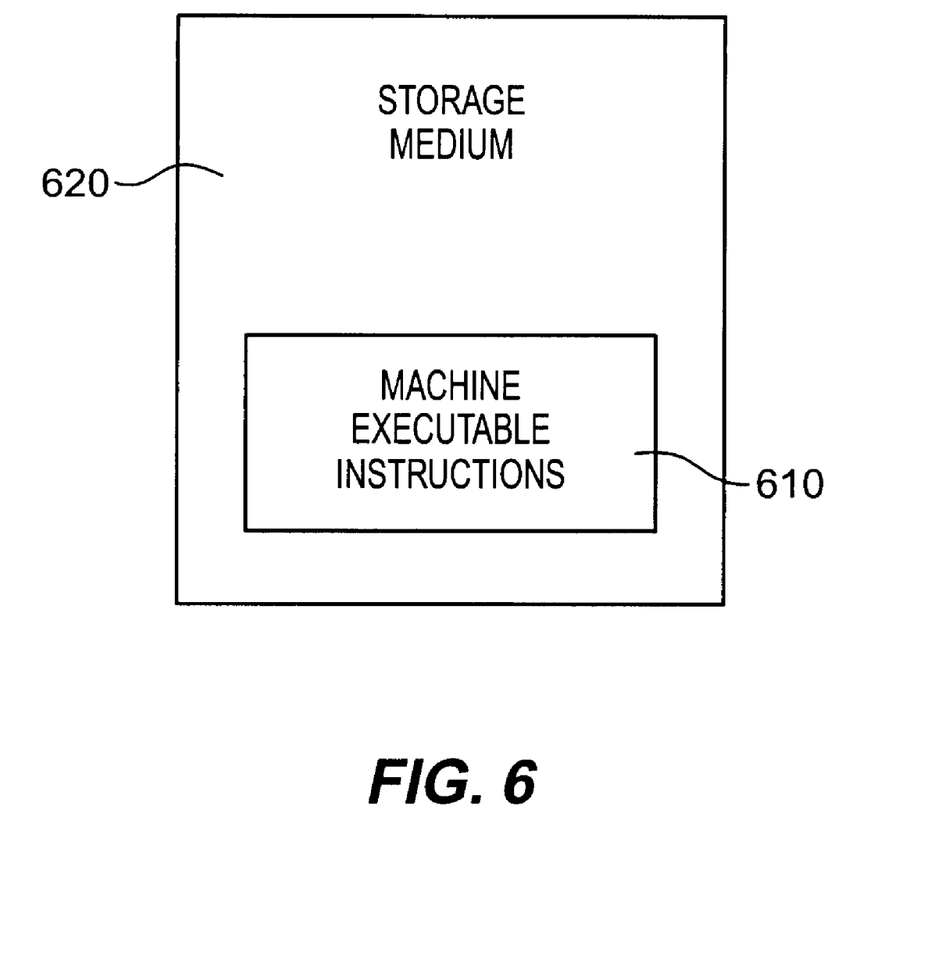
FIG. 6 illustrates one embodiment of a storage medium to contain machine readable instructions for one embodiment of the present invention.

In one embodiment, database testing unit 110 as discussed above, is implemented as a series of software routines run by the hardware system of FIG. 5. These software routines comprise a plurality or series of instructions to be executed by a microprocessor in a hardware system, such as processor 510 of FIG. 5. Initially, the series of instructions can be stored on a storage device, such as permanent memory 540. As shown in FIG. 6, it is to be appreciated that the series of instructions can be machine executable instructions 610 stored using any machine readable storage medium 620, such as a diskette, CD-ROM, magnetic tape, digital video or versatile disk (DVD), laser disk, ROM, Flash memory, etc. It is also to be appreciated that the series of instructions need not be stored locally, and could be received from a remote storage device, such as a server on a network, a CD ROM device, a floppy disk, etc., through, for instance, communications interface 590. The instructions may be copied from the storage device into temporary memory 520 and then accessed and executed by processor 510. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. In another example, database testing unit 110 could be implemented in one or more ASICs on an additional circuit board and the circuit board could be inserted into the hardware system of FIG. 5.

Thus, a method and apparatus to automatically eliminate duplicate database information and identify holes in a knowledge base is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:

submitting a query to a searchable knowledge base;

automatically identifying a "hole" in the searchable knowledge base if a search output, provided to a response detector, does not include at least one response, and automatically generating a no response indication if no responses are returned by the searchable knowledge base for the query or if no responses are provided in an identifiable format; and automatically facilitating provision of a response to the searchable knowledge base by adding a new item or by modifying an existing item of information to enable at least one response to be returned for future resubmission of the query if the no response indication is generated;

receiving responses to the query, if any;

automatically determining if there are duplicates among said received responses, automatically eliminating, based on a specific criteria, any determined duplicates or substantially identical items from said received responses;

automatically removing duplicate database entries to prevent the search engine from providing duplicate information in the future;

automatically determining if there are invalids among said received responses, automatically eliminating any determined invalids from said received responses; and automatically facilitating provision of a response to the searchable knowledge base by adding a new item or by modifying an existing item of information to enable at least one appropriate response for the query in the future, if the query is valid and all of the responses to the query are irrelevant.

2. The method of claim 1 further comprising:

automatically determining if there are duplicates among said received responses; and automatically eliminating any determined duplicates from said received responses.

3. The method of claim 1 further comprising:

automatically generating a no response indication if no responses are returned by a searchable knowledge base for the query; and automatically facilitating provision of a response to the searchable knowledge base to enable at least one response to be returned for future resubmission of the query if the no response indication is generated.

4. The method of claim 1 further comprising:

automatically facilitating provision of a valid response to a searchable knowledge base to enable at least one valid response to be returned for future resubmission of the query if said responses are determined invalids.

5. The method of claim 1 further comprising:

stripping the query of common words;

stripping a response of common words;

comparing words that remain in the stripped query to words that remain in the stripped response and synonyms of the words that remain in the stripped response; and indicating validity of the response based on the comparison.

6. The method of claim 5 wherein the comparing words comprises:

counting the number of the words remaining in the stripped query that appear in the words remaining in the stripped response and the synonyms of the words remaining in the stripped response.

7. The method of claim 6 further comprises:

indicating the response is invalid if less than X percent of the words remaining in the stripped query appear in the words remaining in the stripped response and the synonyms of the words remaining in the stripped response.

8. A method comprising:

submitting a query to a searchable knowledge base;

automatically identifying a "hole" if a search output resulting from the query does not include at least one response, and automatically generating a no response indication if no responses are returned by the searchable knowledge base for the query or if no responses are provided in an identifiable format; and automatically facilitating provision of a response to the searchable knowledge base by adding a new item or by modifying an existing item of information to enable at least one response to be returned for future resubmission of the query if the no response indication is generated.

9. A machine readable storage medium having stored thereon machine readable instructions, the execution of said machine readable instructions to implement a method comprising:

submitting a query to a searchable knowledge base;

automatically identifying a "hole" if a search output resulting from the query does not include at least one response, and automatically generating a no response indication if no responses are returned by the searchable knowledge base for the query;

automatically facilitating provision of a response to the searchable knowledge base by adding a new item or by modifying an existing item of information to enable at least one response to be returned for future resubmissions of the query if the no response signal is generated;

receiving responses to the query, if any;

automatically determining if there are duplicates among said received responses;

automatically eliminating, based on a specific criteria, any determined duplicates or substantially identical items from said received responses;

automatically removing duplicate database entries to prevent the search engine from providing duplicate information in the future;

automatically determining if there are invalids among said received responses; and automatically eliminating any determined invalids from said received responses; and automatically facilitate provision of a response to the searchable knowledge base by adding a new item or by modifying an existing item of information to enable at least one appropriate response is retrieved for that or similar query in the future, if the query is valid and all of the responses to the query are irrelevant.

10. A database testing unit comprising:

a response detector to automatically identify a "hole" if the search output, provided to the response detector, does not include at least one response, and automatically generate a no response indication if no responses are returned by a searchable knowledge base for the query or if no responses are provided in an identifiable format, and automatically facilitate provision of a response to the searchable knowledge base by adding a new item or by modifying an existing item of information to enable at least one response to be returned from the searchable knowledge base for future resubmissions of the query if the no responses indication is generated;

a duplicate remover to automatically determine if there are duplicates among responses returned by the searchable knowledge base for the query, and automatically eliminate, based on a specific criteria, any determined duplicates or substantially identical items from said returned responses, and automatically remove duplicate database entries to prevent the search engine from providing duplicate information in the future; and a validation unit, said validation unit to automatically determine if there are invalids among responses returned by the searchable knowledge base for the query, and automatically eliminate any determined invalids from said returned responses, and automatically facilitate provision of a response to the searchable knowledge base by adding a new item or by modifying an existing item of information to enable at least one appropriate response is retrieved for that or similar query in the future, if the query is valid and all of the responses to the query are irrelevant.

11. The apparatus of claim 10, wherein the validation unit further comprises:

a language stripper to strip the query, and a response, of common words;

a synonym generator to provide synonyms of words remaining in the stripped response; and a comparison unit to compare words remaining in the stripped query to the words remaining in the stripped response and the synonyms of the words remaining in the stripped response, and to indicate validity of the response based on the comparison.

12. A method comprising:

submitting a query to a searchable knowledge base;

automatically identifying a "hole" if a search output, provided to the response detector, does not include at least one response, and automatically generating a no response indication if no responses are returned by the searchable knowledge base for the query;

automatically facilitating provision of a response to the searchable knowledge base by adding a new item or by modifying an existing item of information to enable at least one response to be returned for future resubmissions of the query if the no response signal is generated;

receiving responses to the query, if any;

automatically determining if there are duplicates among said received responses;

automatically eliminating, based on a specific criteria, any determined duplicates or substantially identical items from said received responses;

automatically removing duplicate database entries to prevent the search engine from providing duplicate information in the future;

automatically determining if there are invalids among said received responses; and automatically eliminating any determined invalids from said received responses; and automatically facilitate provision of a response to the searchable knowledge base by adding a new item or by modifying an existing item of information to enable at least one appropriate response is retrieved for that or similar query in the future, if the query is valid and all of the responses to the query are irrelevant.

13. The method of claim 12 further comprising:

stripping the query, and a response, of common words;

providing synonyms of words remaining in the stripped response; and comparing words remaining in the stripped query to the words remaining in the stripped response and the synonyms of the words remaining in the stripped response, and indicating validity of the response based on the comparison.

14. The machine readable storage medium of claim 9 further comprising:

stripping the query, and a response, of common words;

providing synonyms of words remaining in the stripped response; and comparing words remaining in the stripped query to the words remaining in the stripped response and the synonyms of the words remaining in the stripped response, and indicating validity of the response based on the comparison.

15. The method of claim 8 further comprising:

receiving responses to the query, if any;

automatically determining if there are duplicates among said received responses;

automatically eliminating, based on a specific criteria, any determined duplicates or substantially identical items from said received responses; and automatically removing duplicate database entries to prevent the search engine from providing duplicate information in the future.

16. The method of claim 8 further comprising:

automatically determining if there are invalids among said received responses; and automatically eliminating any determined invalids from said received responses; and automatically facilitate provision of a response to the searchable knowledge base by adding a new item or by modifying an existing item of information to enable at least one appropriate response is retrieved for that or similar query in the future, if the query is valid and all of the responses to the query are irrelevant.

17. The method of claim 16 further comprising:

stripping the query, and a response, of common words;

providing synonyms of words remaining in the stripped response; and comparing words remaining in the stripped query to the words remaining in the stripped response and the synonyms of the words remaining in the stripped response, and indicating validity of the response based on the comparison.

\* \* \* \* \*